United States Patent [19]
McCloy et al.

[11] Patent Number: 5,144,767
[45] Date of Patent: Sep. 8, 1992

[54] CONTROLLER FOR AGRICULTURAL SPRAYS

[75] Inventors: Keith McCloy, Pasig, Philippines; Warwick Felton, Tamworth, Australia

[73] Assignee: The Minister for Agriculture & Rural Affairs for the State of New South Wales, Sydney, Australia

[21] Appl. No.: 646,790

[22] Filed: Feb. 22, 1991

[30] Foreign Application Priority Data

Jun. 20, 1989 [WO] World Int. Prop. O. ............... PCT/AU89/00267

[51] Int. Cl.⁵ .................................. A01G 1/12
[52] U.S. Cl. ....................................... 47/1.7
[58] Field of Search .............. 47/1.7, 1.43; 239/170, 239/78; 250/223, 560

[56] References Cited

U.S. PATENT DOCUMENTS 4,206,569 6/1980 Randolph ..................... 47/1.7
4,709,505 12/1989 Lempa ........................ 47/1.7
4,991,341 2/1991 Douglas ...................... 47/1.7

Primary Examiner—Henry E. Raduazo
Attorney, Agent, or Firm—Brooks Haidt Haffner & Delahunty

[57] ABSTRACT

An agricultural spray is controlled by an apparatus having a sensor (15) for determining the irradiance in the red and near infrared wavebands of the electromagnetic spectrum and a plurality of sensors (13) for determining the radiance of a target area to be sprayed in the red and near infrared wavebands. A controller (14) which controls the individual sprays (12) of the agricultural spray compares the measurements taken by the sensors (15 and 13) and compares the ratio of these values (reflectance) to determine if the spray for the particular target area should be turned on or turned off. The determination may be made by simply looking up tables of reflectance values or by carrying out the calculations of non-linear decision algorithms.

4 Claims, 2 Drawing Sheets

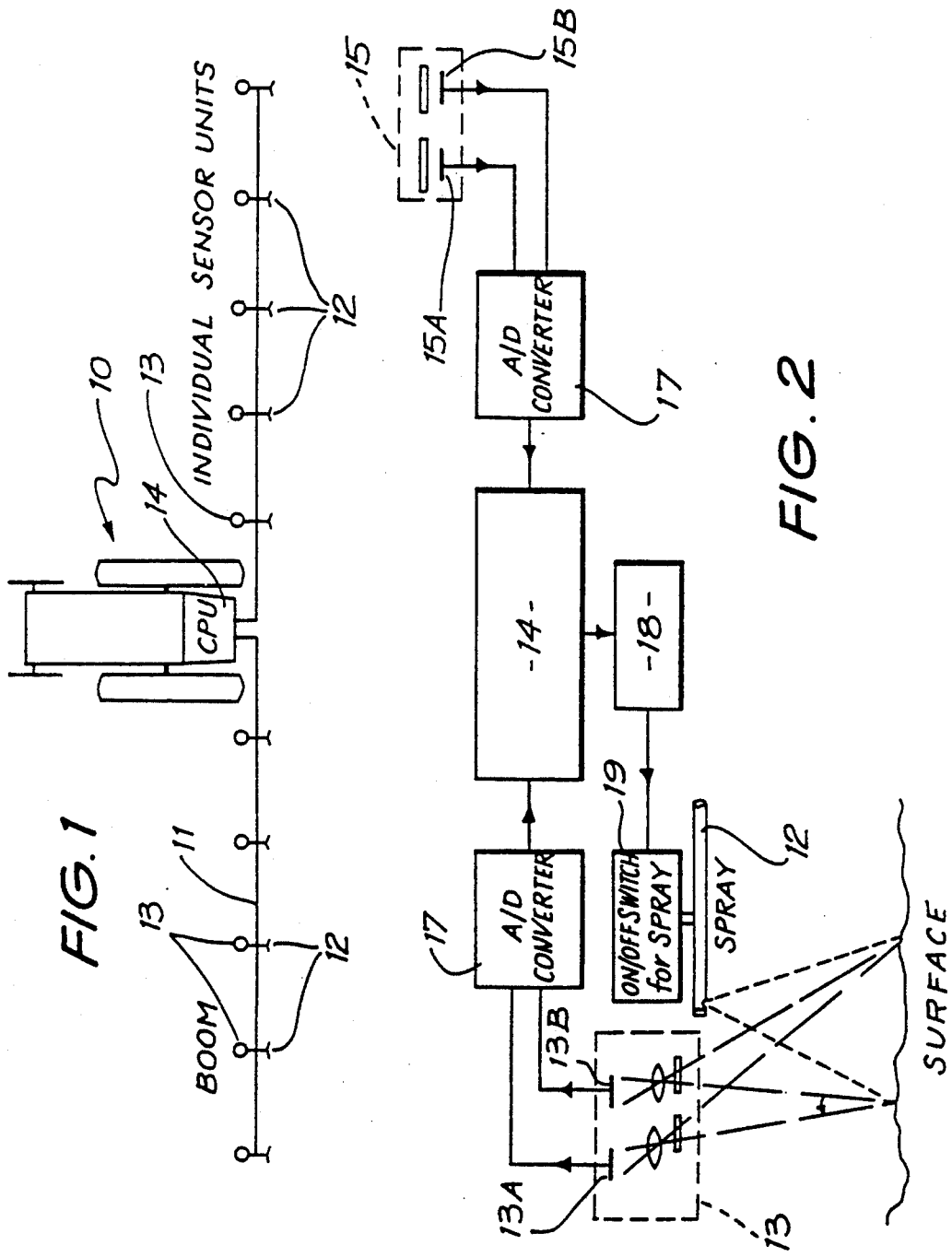

CONTROLLER FOR AGRICULTURAL SPRAYS

TECHNICAL FIELD

The present invention relates to the control of agricultural sprays with particular application to selective spraying of herbicides for non-tillage cultivation programmes.

BACKGROUND ART

In this specification, by way of example only, the invention will be described with reference to the control of herbicidal sprays. However, it should be realised that this invention does have important applications in controlling the use of other agricultural sprays, such as fertilizers and insecticides and for detectors used to estimate the biomass of an area.

In minimum-tillage or non-tillage cultivation, herbicides are used to control unwanted weed growth in a field. The main reason for controlling unwanted growth is to minimize the loss of moisture and nutrients from the soil. The herbicides used in these types of cultivation are expensive and in many situations it is not necessary for the entire field to be sprayed as unwanted vegetation may not cover the entire area. However, previously, the entire field would be sprayed to ensure that all the weeds are sprayed, thus resulting in unnecessary spraying of some areas.

Recent developments have produced vegetation detection units which detect the amount of radiance in the red and near infra-red wavebands. These detection units have been used to provide an estimate of the biomass in a given area. The estimate provided is based on the difference in the measured ratios of the red to near infra-red radiance between an area of bare soil, used as a reference value, and the area under investigation. Satisfactory use of these radiation detectors depends upon the intensity of irradiance in the area and is thus less accurate during periods of changing light conditions. These vegetation detection units, in making an estimate of the percentage of biomass in the area have used a simple ratio of the radiance in the red and near infra-red wavebands of the electromagnetic spectrum.

Irradiance may be defined as the rate of flow of energy onto a surface, per unit surface area, and radiance may be defined as the rate of flow of energy reflected from a surface per unit solid angle from a unit source area on the surface.

Under direct sunlight there is a certain level of red and near infra-red light energy or irradiance that hits the earth's surface. Under cloudy conditions the amount decreases, with the decrease being most marked in the near infra-red region due to absorption by atmospheric moisture and clouds and due to shorter wave length scattering in the atmosphere. The energy incident on the detectors will change with changes in ambient conditions. Thus the approach of using energy (radiance) is subject to considerable variability that makes it difficult to calibrate or adopt standard decision making processes.

Reflectance is defined as the ratio of reflected energy to incident energy. Reflectance should stay the same or approximately the same under different light conditions for a given target. It is more consistent than radiance and hence easier to process so as to arrive at a machine decision. It is for this reason that reflectance has been chosen as the decision making criteria, rather than radiance.

DISCLOSURE OF INVENTION

The present invention is concerned with arrangements which utilize reflectance from a target area in order to determine the percentage of the instrument's field of view that is covered by green vegetation. This enables discrimination between zones requiring the application of a spray and those not to be sprayed.

Accordingly, the present invention may be defined as providing an apparatus for controlling an agricultural spray. The apparatus has sensing means for determining irradiance in first and second bands of the electromagnetic spectrum, sensing means for determining the radiance of a target area in the first and second bands and means for controlling a spray in accordance with a determination of the relationship between the ratios of the radiance to the irradiance in each band respectively (reflectance).

Preferably the reflectance ratios are measured in the red and near infra-red wavebands of the electro-magnetic spectrum. These bands are chosen because the chlorophyll pigment in green vegetation absorbs the red energy and the plant leaf material and structure cause high reflectance in the near infra-red region whereas other surfaces may have similar reflectance values in either band, no other surfaces are similar in both bands. In addition both wavebands are dominated by reflected solar radiation, with negligible energy being contributed by radiation from the earth itself. In consequence, green vegetation is quite dissimilar to all other surfaces when analysing the reflectance values of both wavebands.

As reflectance values vary for different types of target areas, this characteristic is exploited to achieve an effective decision making process that provides good discrimination between target area types. Different reflectance values are obtained for weeds, bare earth, water, decaying vegetation and stubble, respectively and judicious use of the present invention can be made to suit particular circumstances. The benefit of using reflectance rather than radiance, is that changes in reflectance values are small or negligible under different light conditions. Radiance on the other hand, increases as irradiance increases and is, therefore, difficult to calibrate.

The present apparatus is capable of operating under a wider variety of conditions including artificial illumination during periods of low light. Whereas, the prior art uses a fixed ratio or linear decision algorithm due to the variations in the actual values of the red and reflected solar infra-red radiation under different lighting conditions, the present invention may make use of non-linear decision algorithms to further improve the accuracy of the instrument. In certain embodiments, it may be desirable to use three or more bands of the electromagnetic spectrum to improve performance.

Preferably, the determination of whether or not to spray is made by comparing the reflectance values with predetermined values which are stored within the memory of the apparatus in the form of a look-up table. This determination thus depends upon the calculated values of the reflectance in the two bands being measured. The look-up table may be varied depending upon the particular target required. For example, in non-tillage agricultural applications in which herbicides are being sprayed, it is necessary to distinguish between weeds and other surfaces. The look-up table would then be tailored so that the characteristic reflectance values in the two bands indicative of weeds would turn on the spray.

Green vegetation is quite dissimilar to other surfaces when simultaneously analysing the reflectance in the red and near infra-red bands. However, other surfaces may have values in these bands that yield a similar ratio of the values to that of green vegetation. Decaying vegetation litter has very low reflectance values in both bands but a similar ratio to that of green vegetation. In consequence, a straight (simple) ratio of the two bands may not provide the best means of separating green vegetation from all other covers or target types. Other types of decision surfaces (decision algorithm) may provide more reliable discrimination of green vegetation, consequently allowing more efficient herbicide use.

The principles of the present invention, of using reflectance values rather than radiance ratios, may be used in vegetation detectors used to estimate biomass of areas under investigation, either as hand operated or boom mounted models.

BRIEF DESCRIPTION OF DRAWINGS

Notwithstanding any other forms that may fall within its scope, one preferred form of the invention will now be described, by way of example only, with reference to the accompanying drawings in which:

FIG. 1, is a schematic plan of apparatus mounted on a tractor for use in spraying herbicide in a field;

FIG. 2, is a block diagram of the apparatus according to one particular embodiment of the invention.

MODES FOR CARRYING OUT THE INVENTION

Figure 3:
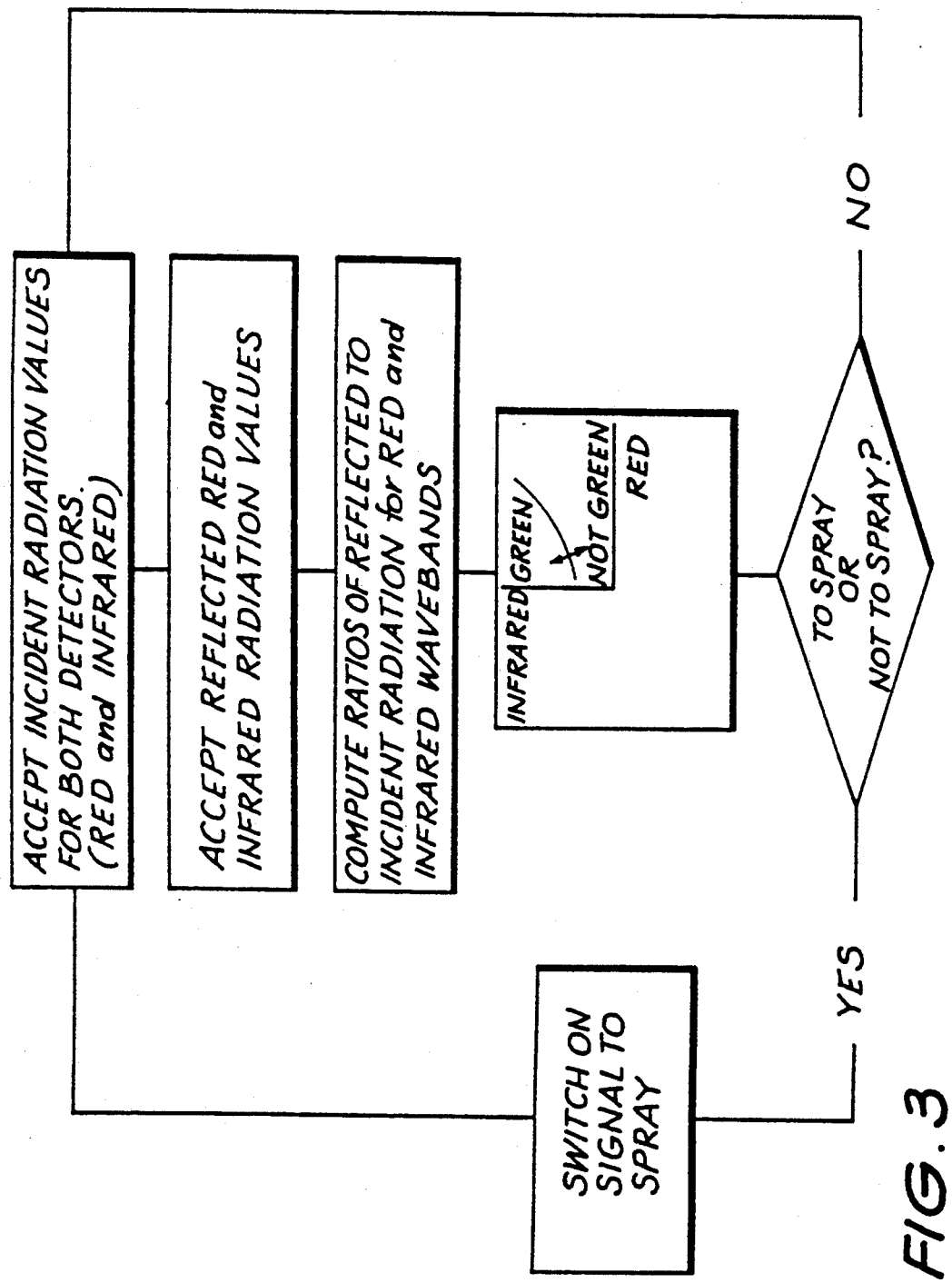
FIG. 3, is a logic flow diagram illustrating the basic logic to be utilized in an electronic circuit of the apparatus of FIG. 2.

The apparatus, as illustrated in FIG. 1, may be mounted on a tractor 10 or other means to allow the apparatus to traverse the area to be sprayed. The apparatus comprises a boom 11 having a plurality of separate spray heads 12 for spraying respective target areas and a corresponding sensor unit 13 for each target area. Each of the spray heads is connected through a solenoid operated valve (not shown) to a pressurized source of liquid herbicide carried by the tractor.

As can be seen from FIG. 2, the apparatus also includes a central processing unit (CPU) 14 electronically linked to the individual sensor units 13 and to an incident light detector 15. Each sensor unit 13 comprises reflected radiation detectors 13A and 13B, for detecting light reflected from their particular target area in the red and reflected solar infra-red bands of the electromagnetic spectrum respectively. The sensor unit 15 comprises incident radiation detectors 15A and 15B for detecting the amount of ambient light in the red and reflected solar infra-red bands of the electromagnetic spectrum respectively. This sensor unit 15 detects the strength of the incident radiation used in calculating the reflectance values. All of the sensor units 13 and 15 supply analog signals to respective analog-to-digital converters 17, which in turn provide digital signals to the CPU 14. The CPU computes the reflectance values of the respective bands, compares the relationship between the two reflectance values and provides an output signal to a digital-to-analog converter 18. The reflectance values for each band is determined as a ratio of the reflected energy or light for that band to the incident energy or light for that band, i.e., for the red band the reflectance value is calculated as the ratio of the value produced by detector 13A to the value produced by detector 15A. Once the two reflectance values have been determined they are compared and an output signal produced. This output signal depends upon a value in a look-up table used to determine if the sprays should be turned on or off in accordance with the value of the infra-red and red reflectance values. The converter 18 supplies a control signal to a solenoid valve 19 controlling the spray head for the target area under consideration.

It should be appreciated that only a single set of incident radiation detectors needs to be provided for the entire apparatus as its detected values can be utilized by the CPU for computing the individual reflectance values with the values from each of the target sensor units 13.

The CPU 14 is arranged to compute separately a decision for each of the sprays on the booms. Preferably a decision is made at least ten times per second with a most preferred frequency being in the order of 100 times per second.

FIG. 3 indicates the logic diagram followed by the CPU 14 in controlling the apparatus. At the beginning of the sequence the CPU interrogates the incident radiation sensor to obtain the value of incident radiation for both the red and reflected solar infra-red bands determined by the respective detectors. Next the reflected radiation values from one of the sensor units 13 is interrogated and the ratios of reflected to incident radiation for the red and infra-red bands are computed. These ratios or reflectance values are then compared to determine whether or not the spray for this particular target area is to be turned on. The decision of whether or not to spray may be computed from a mathematical algorithm or may simply involve comparing the values in a look-up table stored in the memory of the CPU. The CPU then issues an output signal indicating whether or not the spray for this particular target area is to be turned on and repeats the sequence using the next sensor unit 13 in the series. Each sensor unit 13 is accessed in sequence and when the last sensor unit has been interrogated the entire sequence is again reinitiated under the control of a clock (not shown) as the tractor progresses across the field.

There may be incorporated an override sensor (not shown) by which all the spray heads are turned off should the tractor be stationary. Thus, avoiding repetitive spraying of the same target area.

Although one embodiment of the invention has been described in detail, it is to be realised that the invention is not to be limited hereto but can include various modifications falling within the spirit and scope of the invention.

I claim:

1. Apparatus for controlling an agricultural spray, the apparatus comprising:
    sensing means for determining irradiance in first and second bands of the electromagnetic spectrum;
    sensing means for determining the radiance of a target area in the first and second bands; and
    means for controlling a spray in accordance with a determination of the relationship between the ratios of the radiance to the irradiance in each band respectively.

2. Apparatus as defined in claim 1 further incorporating an override sensor arranged to detect movement of the apparatus and said controlling means being responsive to said override sensor to turn off the spray when the apparatus is stationary.

3. Apparatus as defined in claims 1 or 2 wherein said controlling means incorporates a CPU and memory, wherein the memory contains a lookup table for comparing the ratios of the radiance to the irradiance in each band to determine if the spray should be turned on.

4. An apparatus as defined in claims 1 or 2 wherein the first and second bands are the red and of the electromagnetic spectrum.

* * * * *

UNITED STATES PATENT AND TRADEMARK OFFICE
CERTIFICATE OF CORRECTION

PATENT NO. : 5,144,767

DATED : September 8, 1992

INVENTOR(S) : Keith McCloy; Warwick Felton

It is certified that error appears in the above-identified patent and that said Letters Patent is hereby corrected as shown below:

Column 6, line 5, end of line "and of the electro-" should read: --and near infra-red wavebands of the electro- --.

Signed and Sealed this

Seventh Day of September, 1993

Attest:

BRUCE LEHMAN

Attesting Officer

Commissioner of Patents and Trademarks